United States Patent
Felsen et al.

(10) Patent No.: US 11,755,952 B2
(45) Date of Patent: Sep. 12, 2023

(54) SYSTEM AND METHOD FOR PREDICTIVE SPORTS ANALYTICS USING BODY-POSE INFORMATION

(71) Applicant: STATS LLC, Chicago, IL (US)

(72) Inventors: Panna Felsen, Berkeley, CA (US); Patrick Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 319 days.

(21) Appl. No.: 17/086,705

(22) Filed: Nov. 2, 2020

(65) Prior Publication Data

US 2021/0117735 A1    Apr. 22, 2021

Related U.S. Application Data

(63) Continuation of application No. 15/885,668, filed on Jan. 31, 2018, now Pat. No. 10,824,918.

(60) Provisional application No. 62/452,815, filed on Jan. 31, 2017.

(51) Int. Cl.
| | |
|---|---|
| G06K 9/00 | (2022.01) |
| G06N 20/00 | (2019.01) |
| G06N 5/04 | (2023.01) |
| G06V 20/40 | (2022.01) |
| G06V 40/20 | (2022.01) |
| G06F 18/2415 | (2023.01) |
| G06F 18/23 | (2023.01) |
| G06N 7/01 | (2023.01) |

(52) U.S. Cl.
CPC ............ *G06N 20/00* (2019.01); *G06F 18/23* (2023.01); *G06F 18/2415* (2023.01); *G06N 5/04* (2013.01); *G06N 7/01* (2023.01); *G06V 20/49* (2022.01); *G06V 40/23* (2022.01)

(58) Field of Classification Search
None
See application file for complete search history.

(56) References Cited

U.S. PATENT DOCUMENTS

| | | | |
|---|---|---|---|
| 2014/0201126 | A1 | 7/2014 | Zadeh et al. |
| 2014/0219550 | A1 | 8/2014 | Popa et al. |
| 2014/0244361 | A1 | 8/2014 | Zhang et al. |
| 2015/0139502 | A1 | 5/2015 | Holohan |
| 2017/0266491 | A1* | 9/2017 | Rissanen .............. G09B 19/003 |
| 2018/0218243 | A1 | 8/2018 | Felsen et al. |
| 2019/0091541 | A1 | 3/2019 | Schulte et al. |

\* cited by examiner

*Primary Examiner* — Wei Wen Yang
(74) *Attorney, Agent, or Firm* — DLA PIPER LLP (US)

(57) ABSTRACT

A system is described for analyzing plays of a sporting event based on body-pose information in conjunction with real-world positional tracking data. The system permits segmentation of sporting event plays into discrete time periods and the labeling of appropriate body-pose characteristics for each period. The system allows for comparison and fine-grained analysis of plays with respect to either a series of body-pose vertices that exist in continuous space (i.e., skeleton) or map directly to attributes, using the positional tracking data and play information to account for contextual differences. To enable analysis for the former, the system performs a projection to 3D space, followed by a spatiotemporal alignment step. Through the system, the importance of particular body-pose motions or specific attributes to the success of particular sporting event plays is quantified.

20 Claims, 8 Drawing Sheets

| Attribute | Description | d.o.f. | p-value | | | |
|---|---|---|---|---|---|---|
| | | | $T_{ml} \vee T_{ma}$ | $E_{ml} \vee E_{ma}$ | $T_{ml} \vee E_{ml}$ | $T_{ma} \vee E_{ma}$ |
| Balance | "Overall" | 1 | 0.222 | 0.114 | 0.939 | 0.644 |
| Move Direction | "Before Pass" | 4 | 0.202 | 0.004 | 0.195 | 0.328 |
| | | 4 | 0.483 | 0.454 | 0.034 | 0.201 |
| Pass Quality | "Before Shot" | 2* | 0.117 | 0.697 | 0.049 | 0.178 |
| Pump Fake | | 1 | 0.325 | 0.020 | 0.423 | 0.048 |
| Dribble | | 1 | 0.161 | 0.329 | 0.315 | 0.153 |
| Move Direction | "Just Before Shot" | 3 | 0.070 | 0.297 | 0.253 | 0.721 |
| | | 4 | 0.101 | 0.212 | 0.064 | 0.013 |
| Turn | | 2 | 0.884 | 0.288 | 0.550 | 0.453 |
| Footwork | | 2 | 0.016 | 0.420 | 0.265 | 3e-9 |
| Set Foot Stance | "vs. Shoulders" | 2 | 0.718 | 0.096 | 0.266 | 0.121 |
| Jump Foot | | 1* | 0.318 | 0.268 | 0.422 | 0.338 |
| Legs During Jump | "During Shot" | 2 | 0.213 | 0.741 | 0.698 | 0.637 |
| Legs During Fall | | 2 | 0.559 | 0.024 | 0.803 | 0.008 |
| Landing Foot | | 2 | 0.297 | 0.769 | 0.906 | 0.006 |
| Land Foot Stance | "vs. Torso" | 4 | 0.731 | 0.353 | 0.103 | 0.003 |
| Move | "After Shot" | 4 | 0.002 | 0.247 | 0.456 | 1e-6 |

SYSTEM AND METHOD FOR PREDICTIVE SPORTS ANALYTICS USING BODY-POSE INFORMATION

CROSS-REFERENCE TO RELATED APPLICATIONS

This application is a continuation of pending U.S. patent application Ser. No. 15/885,668, filed Jan. 31, 2018, which claims priority to U.S. Provisional Patent Application No. 62/452,815 filed Jan. 31, 2017, which are incorporated by reference in their entireties.

BACKGROUND OF THE INVENTION

Recent years have seen the development and deployment of commercial sports tracking systems for tracking the movement of players, balls, or other objects on a sports playing field. These tracking systems vary in their operation, and include purely optically-based systems (e.g., using multiple cameras), radio-based systems (e.g., using RFID tags embedded in player equipment), satellite-based systems (e.g., GPS) and hybrid systems. Generally, regardless of the type of tracking system employed, the output of such a system includes the (x, y) location of players, recorded at a high-frame rate. In this manner, the players' behavior has been essentially "digitized" allowing individual game plays to be visualized via multi-agent trajectories.

However, such systems typically only represent an object's position as a single point, or average location. These tracking systems, therefore, typically did not represent or account for a player's appearance during the contest, such as whether a player was off-balance, or show whether a player used good form during a particular maneuver.

Historically, capturing such body-pose information (e.g., the skeleton of a player) within a game situation was unachievable due to technological limitations. Prior systems required a player to wear a motion-capture suit with reflective markers, so that the player's movement could be captured in a controlled lab setting with an array of cameras. However, recent advances in computer vision and machine learning, along with Graphical Processing Units and "deep learning" architectures have made it possible to estimate 3D body-pose information from a monocular camera view (e.g., broadcast camera view), without the need for any dedicated motion capture setup, such as systems described in D. B. M. H. V. Ramakrishna, D. Munoz and Y. Sheikh, "Pose Machines: Articulated Pose Estimation via Inference Machines," in European Conference on Computer Vision (ECCV), 2014, and V. R. S. Wei and Y. Sheikh, "Convolutional Pose Machines," in IEEE Conference on Computer Vision and Pattern Recognition (CVPR), 2016, which are hereby incorporated by reference. Regardless, prior systems have been unable to discern meaningful statistical information for tracking sporting events at a fine-grain level based on such body-pose information.

BRIEF SUMMARY OF THE INVENTION

A system is provided for analyzing plays of a sporting event based on body-pose information in conjunction with real-world positional tracking data. The system permits the segmentation of sporting event plays into discrete time periods and the labeling of appropriate body-pose characteristics for each period. The system preferably builds a classifier for plays based on tracking data to account for contextual differences, and then compares body-pose attribute values across selected sets of plays. Through the system, the importance of particular body-pose attributes to the success of particular sporting event plays can be quantified.

Although the examples described herein relate specifically to the sport of basketball, the system is not limited to any particular sport, and can be applied to any sport or domain with body-pose data fine-grain trajectory data, whether from optical tracking data (e.g., SportVU, or monocular or multi-ocular broadcast video) or wearable devices (e.g., RFID, GPS).

DETAILED DESCRIPTION OF THE INVENTION

Embodiments of the present system process body-pose information for sporting events in a manner that enables fine-grained statistical analysis of plays and players, aiding the generation of analytical statistical predictions for player and team behavior.

Figure 1:
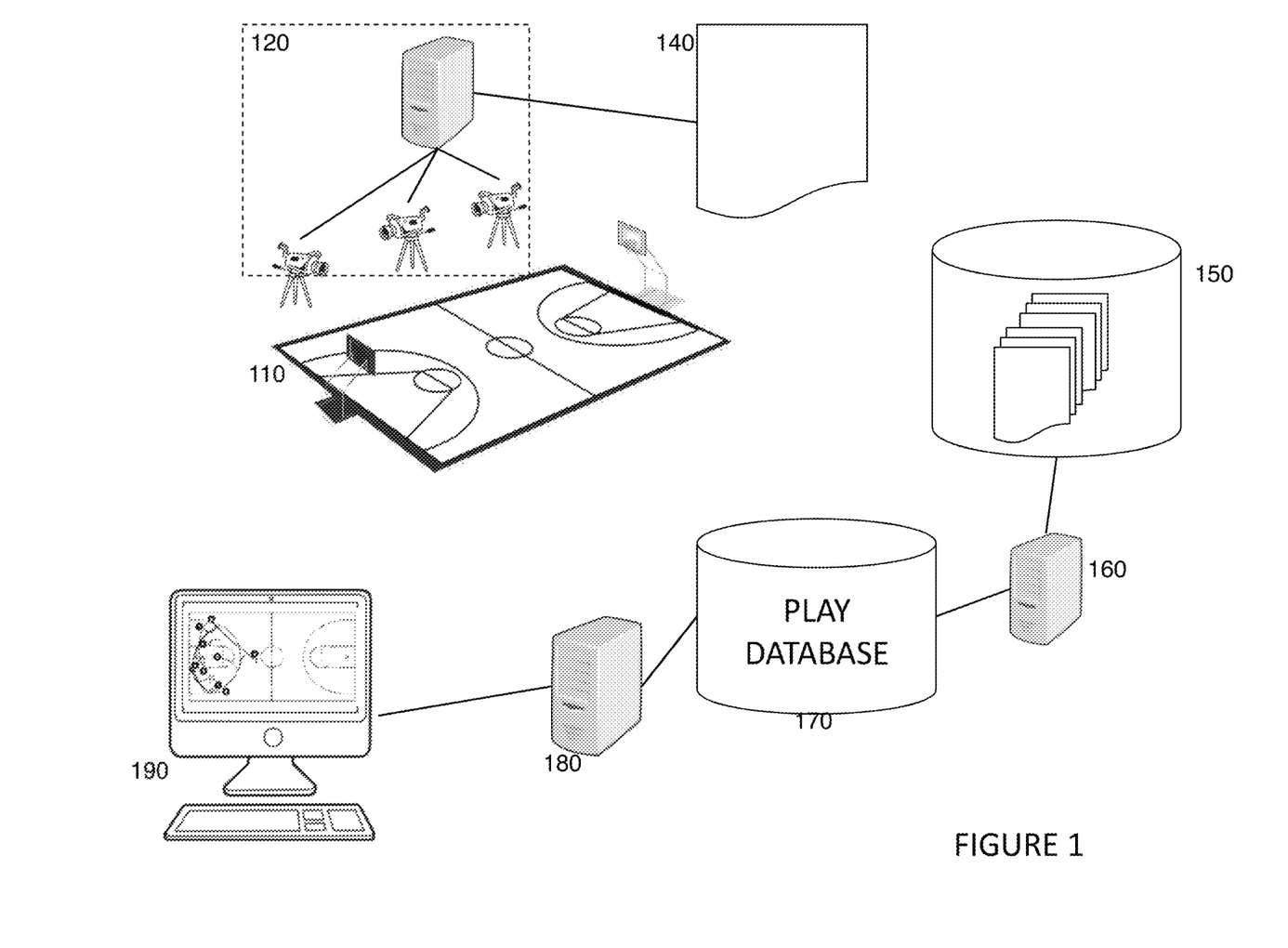
FIG. 1 illustrates an architectural environment for a system for sports analytics, according to an embodiment of the present system.

A general overview of the context of the system is described with respect to FIG. 1, in accordance with an embodiment. At a sporting event taking place at a venue 110, a tracking system 120 records the motions of all players on the playing surface, as well as any other objects of relevance (e.g., the ball, the referees, etc.). Tracking system 120 can be an optically-based system using, for example, a plurality of fixed cameras. Alternatively, tracking system 120 can be a radio-based system using, for example, RFID tags worn by players or embedded in objects to be tracked, or tracking system 120 can be another type of system that tracks moving objects. Preferably, tracking system 120 samples and records at a high frame rate (e.g., 25 frames per second) so as to minimize quantization, enabling expert humans to select the onset and offset of plays at precise times (i.e., frame-level), as well as particular players of interest. Tracking system 120 stores at least player identity and positional information (e.g., (x,y) position) for all players and objects on the playing surface for each frame in a game file 140. The game file 140 is preferably augmented with other event information corresponding to the frames, such as game event information (pass, made shot, turnover, etc.) and context information (current score, time remaining, etc.), and assembled into data store 150 comprising a large number of game files for the given sport (e.g., an entire season of the National Basketball Association games).

Figure 2:
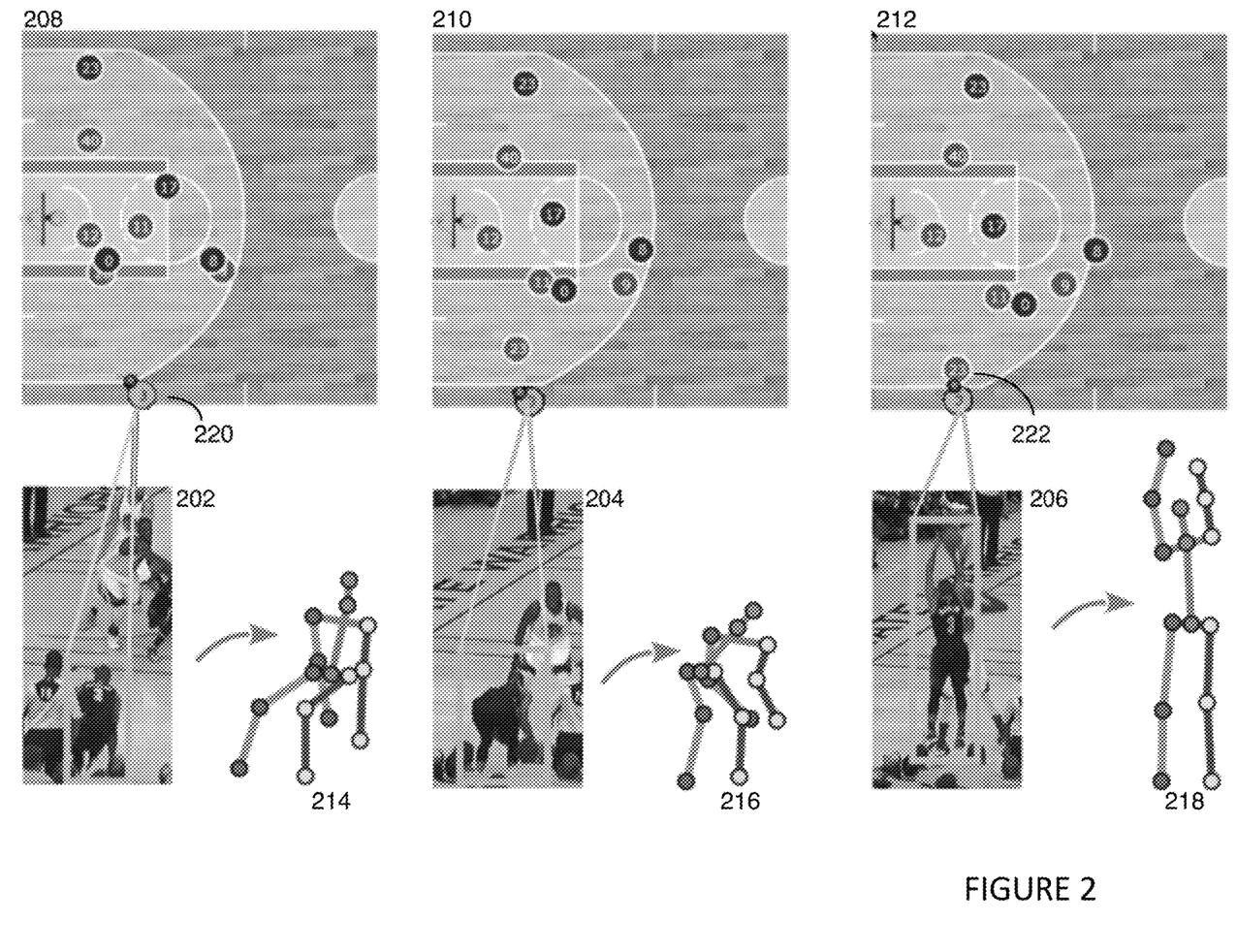
FIG. 2 illustrates representations of a sports play through a tracking system and with body pose analysis, according to an embodiment of the present system.

In embodiments of the invention, body-pose information is obtained for the players involved in the sporting event and stored either with the plays in play database 170 or in a separate database. The body-pose information for players in the sporting event preferably is represented as points in 3D-space forming a "skeleton" for the player. An example of such a skeleton is shown in FIG. 2. Notably, the body-pose information for the event need not be obtained directly at the event site, but instead may be inferred indirectly from, e.g., a television broadcast using, for example, known techniques for extracting such body-pose information for the event from a monocular camera view.

The use of body-pose information by embodiments permits finer-grained analysis for sporting events than has been possible with positional information alone. For example, FIG. 2 shows three frames 202, 204, 206 from the video broadcast of a basketball play over a short time interval, represented both as a traditional positional representation 208, 210, 212 and as 3D body-pose skeletons 214, 216, 218. From the positional information alone, it appears that the player 220 has a clear opportunity for a shot, but does not shoot the basketball until he is guarded by an opposing player 222. The body-pose information 214, 216, however, suggests that the player has received a poorly placed pass and is recovering, permitting the opponent to close in and force an off-balance shot.

Figure 3:
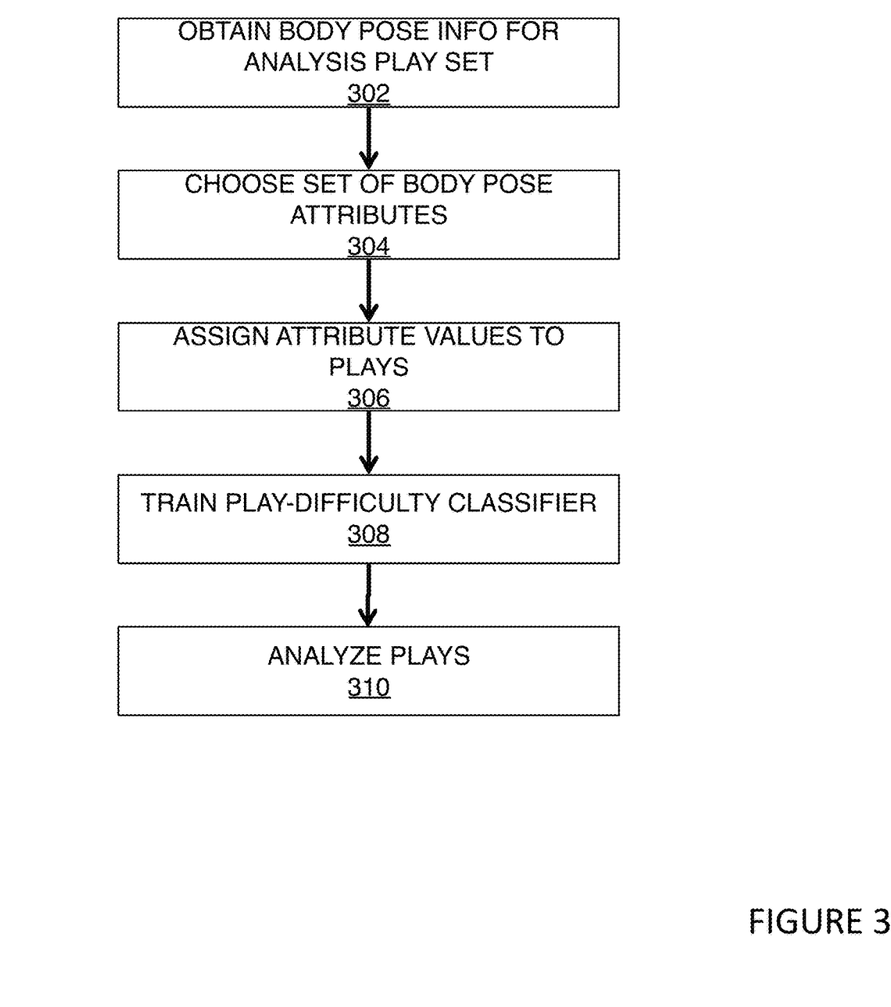
FIG. 3 is a flow diagram illustrating an overview of the process of analyzing sport plays with respect to body-pose information, in accordance with an embodiment of the present system.

Turning to FIG. 3, a flow diagram is shown describing the overall process of identifying body poses that correlate with successful plays in a sporting event, in accordance with an embodiment. In a first portion 302 of the process, 3D body pose information for a number of plays is obtained from video of a sporting event. The body pose information may be obtained by known techniques such as those described above, and is preferably stored in a 3D skeletal data representation. In a second phase 304 of the process, a set of body pose attributes is chosen for labeling and investigation. Values are assigned to the chosen attributes for each play or for a subset of plays at the next phase 306. The process then continues by training a play difficulty classifier at phase 308 by using spatial and temporal information for a subset of plays, to be used with positional and directional information for classifying the difficulty of a play. Once the attributes have been assigned and the classifier has been trained, the process permits fine-grained analysis of plays in the sporting event with respect to the 3D body-pose information at phase 310.

In more detail, the set of body pose attributes chosen at phase 304 may vary based on the sport, the play, or a segment of the play. Thus, the set of body-pose attributes used for one part of a play may differ from the set used in another part of the play. For example, in a basketball 3-point shot, embodiments preferably segment the play into five parts: a) prior to the player possessing the ball; b) after the player possesses the ball but prior to the shot; c) immediately before the shot; d) during the jump and release; and e) after the player lands. Each of these segmented parts of a play may be described with unique combinations of attribute values according to body poses. For example, relevant attributes during the "prior to possession" segment could include indicators of a player's movement and direction, while the "during the jump and release" segment could include descriptors of a player's jumping and landing feet, and the closeness of the player's legs. Additionally, overall play attributes may be used, such as for "overall balance" during the entire play. A set of body-pose attributes measured for these five parts is shown as follows:

| Attribute | Description | Possible Values |
|---|---|---|
| Balance | Overall | Balanced/off-balance |
| Move | Prior to Possessing | No, set/yes, run/yes, walk/yes, hop |
| Direction | | Left/right/forward/backward |
| Pass Quality | Prior to Shot | Good/too high/too low/too left/too right |
| Pump Fake | | Yes/no |
| Dribble | | Yes/no |
| Move | Just Before Shot | None/yes, step/yes, run/yes, walk |
| Direction | | Left/right/forward/backward |
| Turn | | None/yes, left/yes, right |
| Footwork | | Left foot step/Right foot step/hop |
| Set Foot Stance | vs. Shoulders | Aligned/wide/narrow |
| Jump Foot | During Shot | Left foot/right foot/both feet |
| Legs During Jump | | Straight up/swing fwd/separate |
| Legs During Fall | | Together/wide/split |
| Landing Foot | | Left/right/both |
| Land Foot Stance | vs. Torso | Aligned/behind/right/left/front |
| Move | After Shot | None/left/right/forward/backward |

In general, the set of body pose attributes reflect the types of movement variation that may occur during each segment of a play. For example, the attributes might differ for players moving in different ways (running, hopping, and turning) before and after receiving a pass, as opposed to a player who is completely set for his shot as he waits for the pass. The attributes describing the landing of a player after taking a 3-point shot also can differ, such as by reflecting whether a player's feet are front of his torso, whether a player has a wide stance, a player's completely-in-line body pose, whether a player lands on one leg, etc.

The setting of attributes for plays in phase 304 is preferably performed automatically through synchronization of the body-pose information with play information obtained from a tracking system and database such as that described with respect to FIG. 1. An embodiment identifies relevant plays from a play database (e.g., all three-point attempts from a set of basketball games) and then inspects the body-pose information corresponding to the identified plays (e.g., a 3-second window surrounding the identified timestamp for a play) to infer the appropriate values for the particular attributes. Alternatively or additionally, the attributes are not defined in advance, but instead are inferred from the database of plays using unsupervised state discovery, such as through techniques described in Hierarchical Aligned Cluster Analysis for Temporal Clustering of Human Motion, by F. Zhou et al., in IEEE Transactions on Pattern Analysis and Matching Intelligence, v. 35, no. 3, pp. 582-596, 2013, which is herein incorporated by reference.

Figure 4:
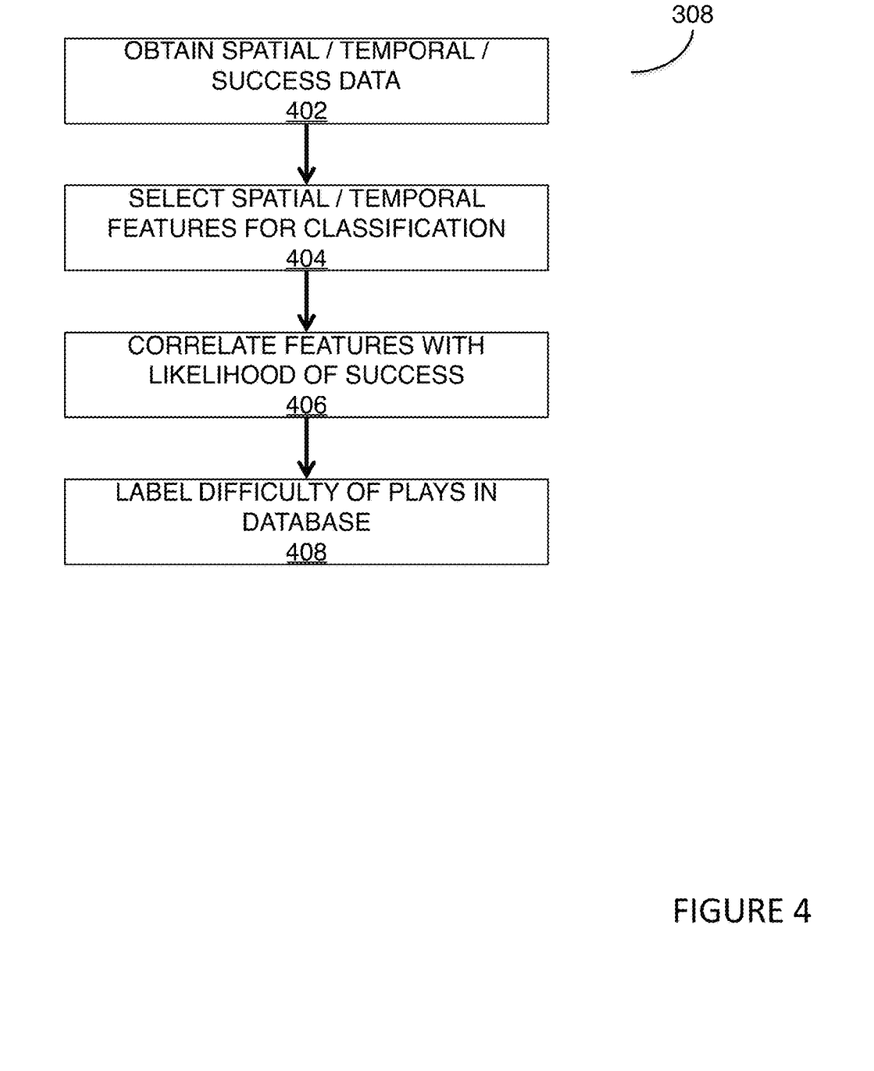
FIG. 4 is a flow diagram illustrating a method of training a computer-based sport play difficulty classifier, in accordance with an embodiment of the present system.

FIG. 4 shows a flow diagram for using spatial and temporal contextual information to train a classifier for the difficulty of a play, as described generally with respect to phase 308 above, in accordance with an embodiment. At step 402, spatial and temporal data is obtained for a set of plays to be used for training the classifier. The data also includes the outcome of a play, such as whether it was successful (e.g., a made shot) or not (e.g., a missed shot). At step 404, particular spatial and temporal features are selected as the basis for the classification. These spatial and temporal features can be computed from data obtained via a sport tracking system, such as described above, and using techniques such as those described in D. Cervone, et al., "POINTWISE: Predicting points and valuing decisions in real time with NBA optical tracking data," in *MIT Sloan Sports Analytics Conference*, 2014, which is incorporated by reference herein. For example, in a basketball analysis, positional information for a five second time window immediately prior to a shot can be used to calculate the time since last play: free throw, field goal, rebound, dribble, pass, player possession, block, and drive. These times, along with player velocities, comprise temporal contextual features. The spatial features, selected to capture the player configuration at the moment of the shot, can include the raw player and ball positions, and the angle and distance between each player and the ball. A logistic regression is performed at step 406 using any of known methods, to correlate the selected features with the likelihood of a successful play. Finally, the plays to be analyzed are labeled according to their likelihood of success. For example, a basketball shot classified with greater than a 53% likelihood of success can be labeled "Easy", whereas those shots classified with less than a 47% likelihood of success can be labeled "Hard."

Thus, the result of applying the classifier to plays in the sporting event is a partitioned set of "easy" and "difficult" plays, which can then be used to normalize examples to be analyzed with respect to body pose information so as to minimize other factors. For example, in a 3-point shot analysis, if a player is being guarded closely, he may be unbalanced to actually take a difficult shot. This is different from a situation when a player has an open shot, and is unbalanced due to his poor technique of ball handling. Thus, the analysis system in an embodiment of the present invention normalizes for shot-context. Naturally, open shots can be either made or missed. Similarly, tough shots can sometimes fall and sometimes not. But accounting for this context permits discovery of which attributes make it more or less likely for a play to result in success, e.g., for a player to make a shot.

Figure 5:
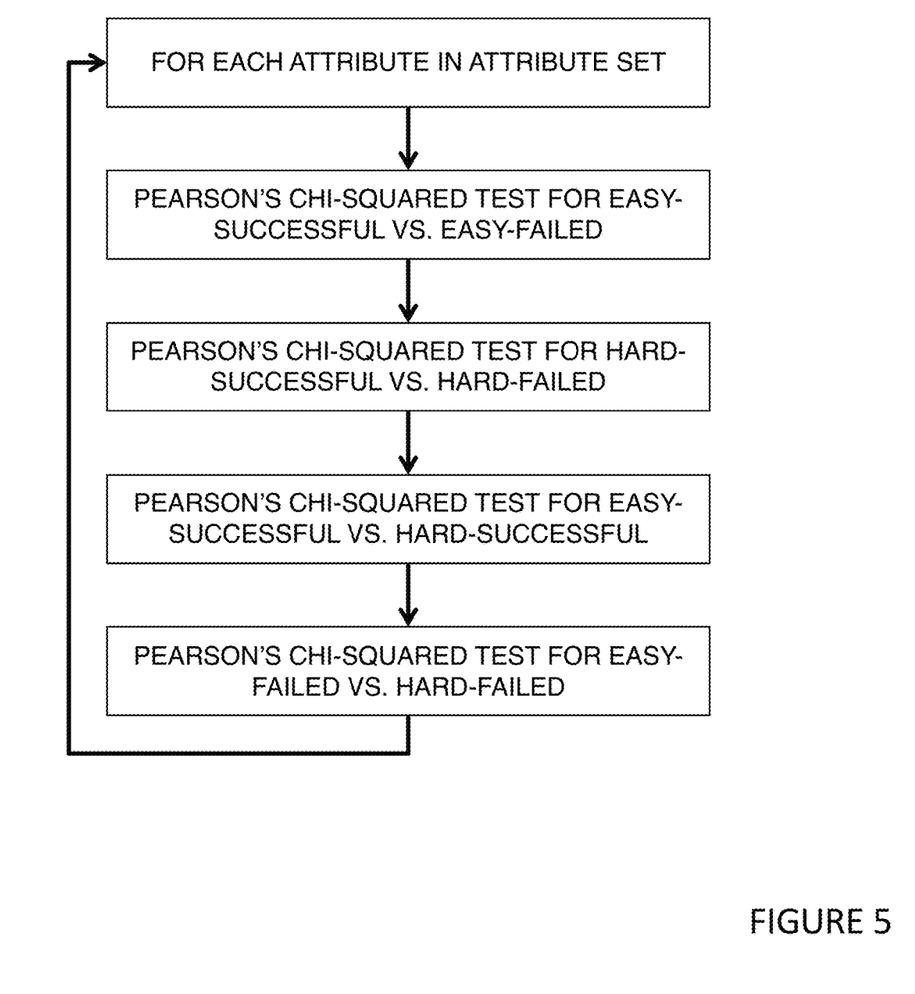
FIG. 5 is a flow diagram illustrating a method for identifying relevant body-pose attributes to a set of sports plays, in accordance with an embodiment of the present system.

To analyze the contribution of a body pose attributes to a play's success, an embodiment performs four statistical comparisons, as shown in FIG. 5: a) attribute values in difficult successful plays versus attribute values in difficult failed plays; b) attribute values in easy successful plays versus attribute values in easy failed plays; c) attribute values in easy successful plays versus attribute values in difficult successful plays; and d) attribute values in easy unsuccessful plays versus attribute values in difficult unsuccessful plays. If there is a statistically significant difference in the presence of an attribute during the first two comparisons, it indicates that the attribute is likely to affect a play's success. If there is a statistically significant difference in the value of an attribute during the second two comparisons, then it identifies the attribute as useful for determining whether a play is easy or difficult. Preferably, a Pearson's chi-squared test is performed for each attribute in the four comparisons.

Figure 6:
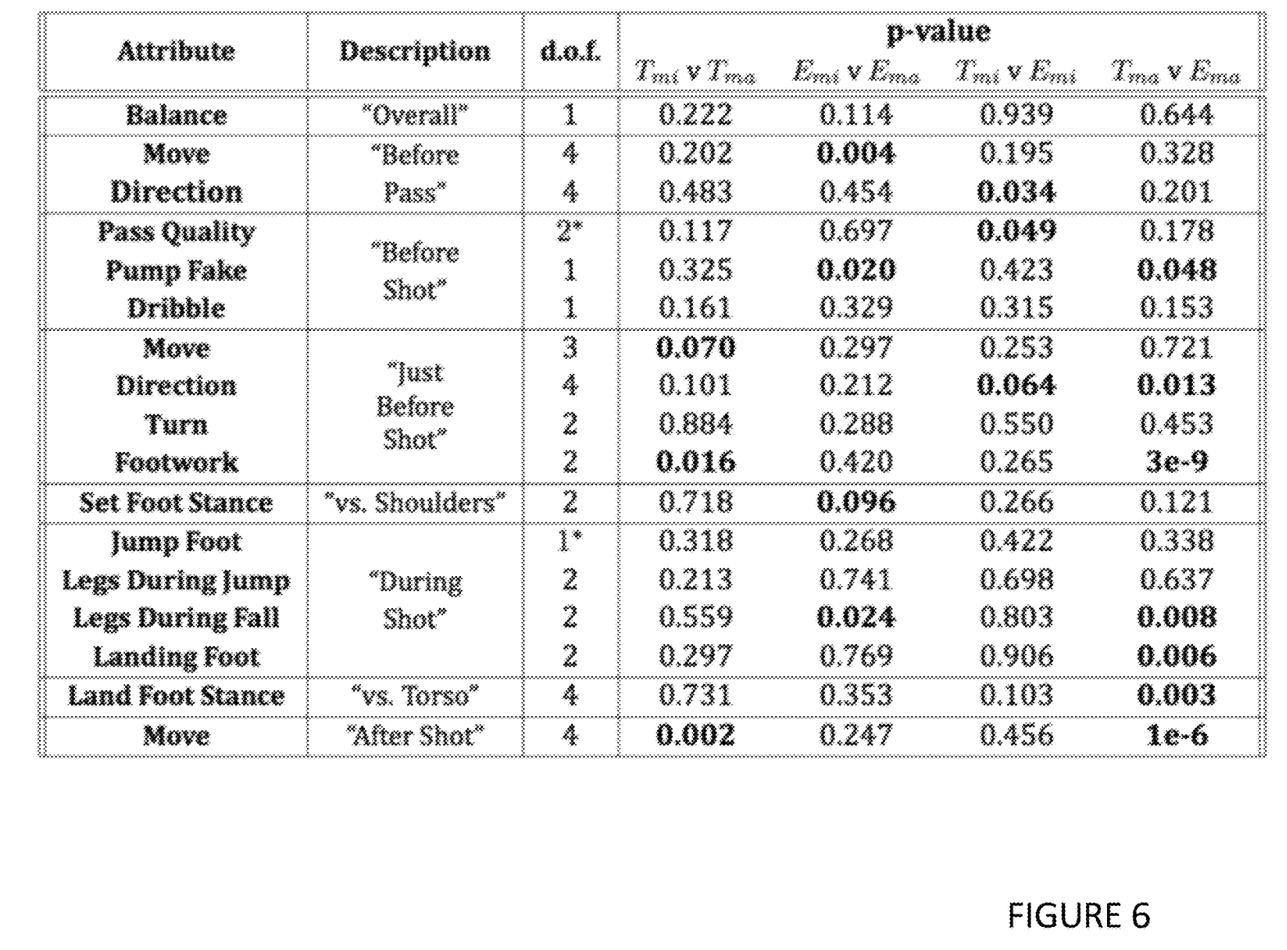
FIG. 6 is a chart illustrating an exemplary application of an embodiment of the present system to identify relevant body-pose attributes to a set of sports plays.

Results from one empirical study are shown in FIG. 6, which shows several body-pose attributes having distinctive distributions between compared 3-point shot classes (Tough-Made, Tough-Missed, Easy-Made, Easy-Missed). Each of the four comparisons display significant differences in at least three body pose attributes (shown in bold), indicating that certain types of body motion correlate with successful versus unsuccessful shots, regardless of the game context. The data further show that the difficulty of a successful play can be predicted from body-pose attributes, since there are statistically significant distributions between successful, easy shots versus successful, difficult shots.

Figure 7:
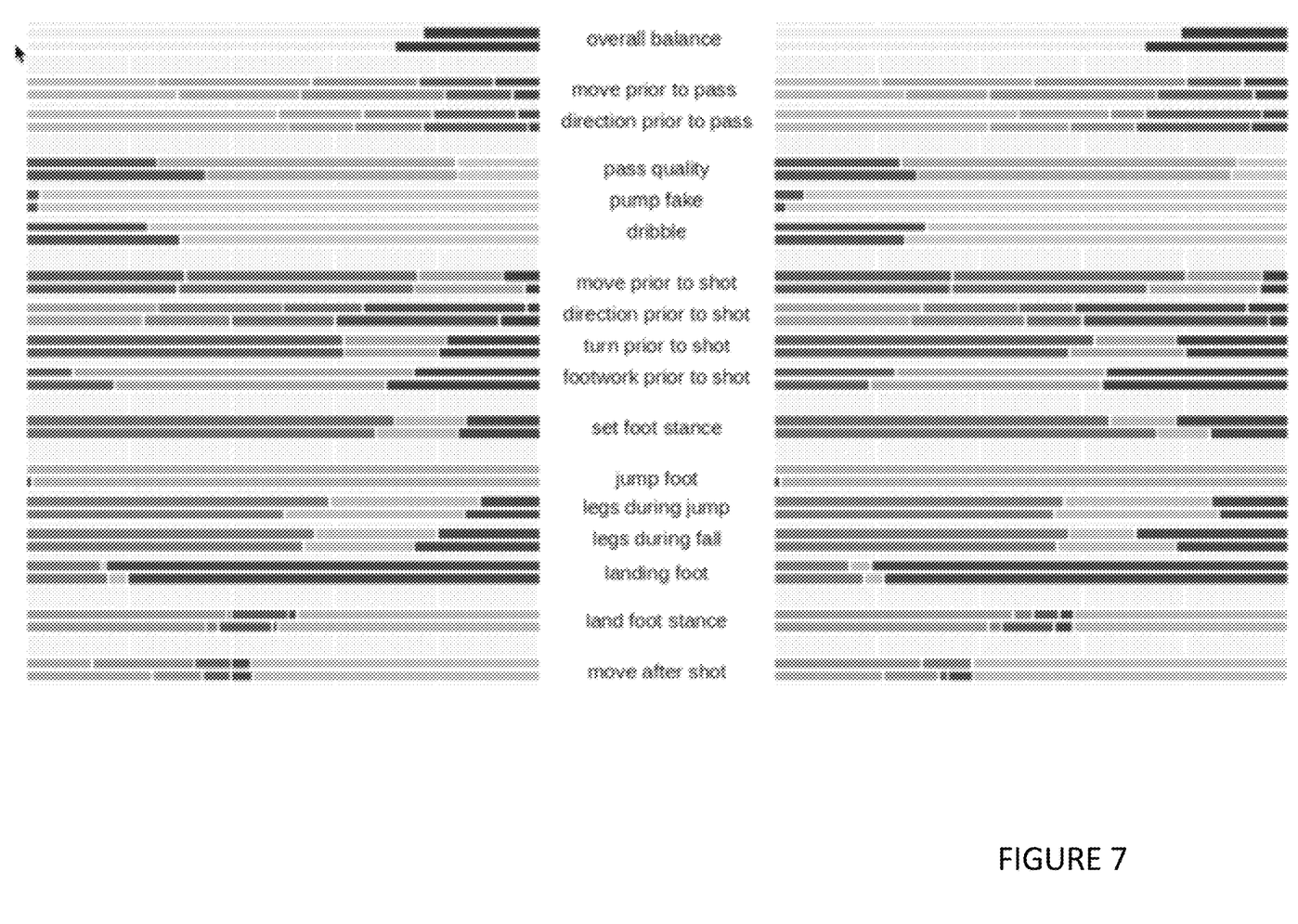
FIG. 7 is a histogram generated by an embodiment of the present system to illustrate the identification of relevant body-pose attributes to a set of sports plays.

Embodiments further visualize analyzed correlations among body-pose attributes by generating, for example, a histogram. In FIG. 7, a first histogram 702 has been generated and displayed to show the comparison of the body pose attributes between difficult made 3-point shots (top) and difficult missed shots (bottom). A second histogram 704 has been generated and displayed to show the comparison of the body pose attributes between easy made shots (top) and easy missed shots (bottom).

Figure 8:
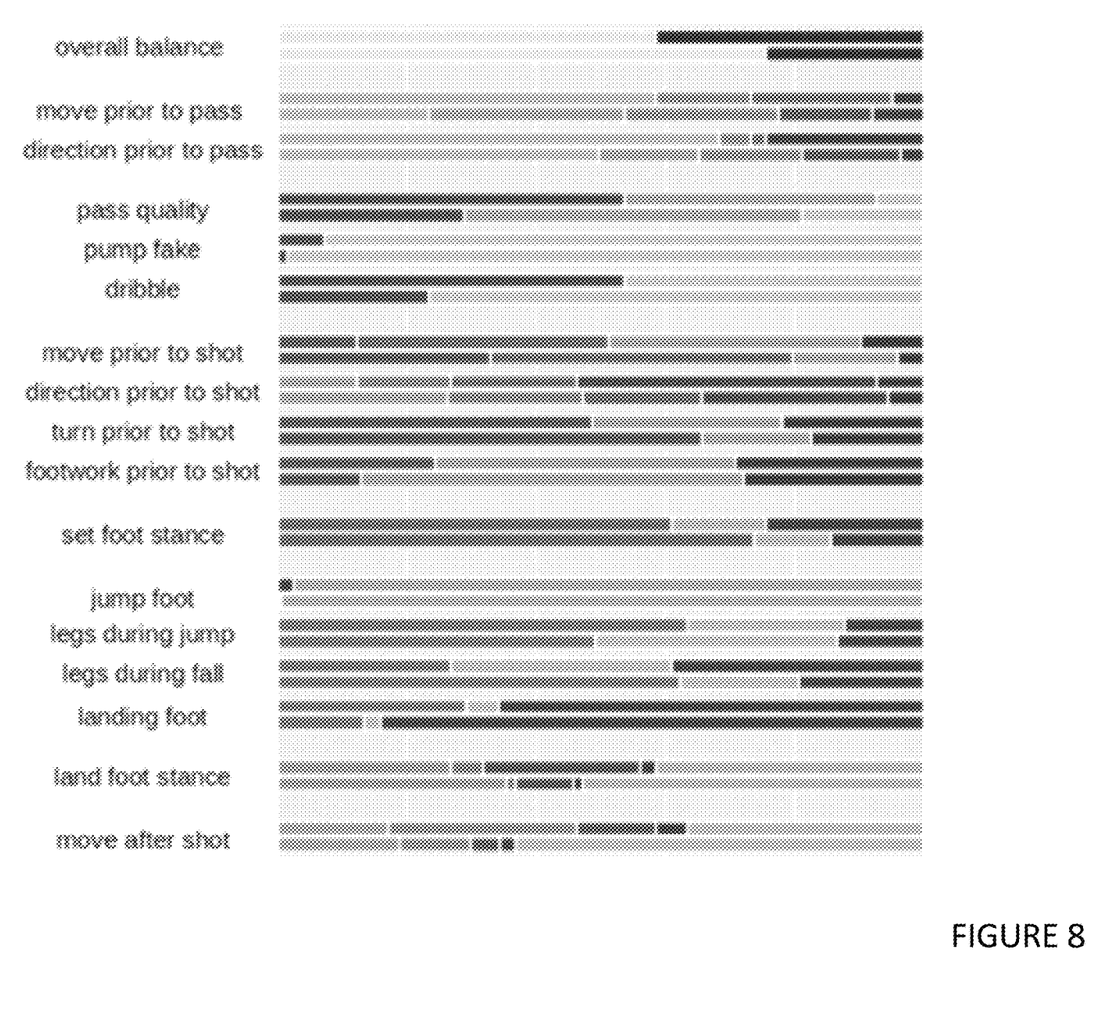
FIG. 8 is a histogram generated by an embodiment of the present system to illustrate the identification of relevant body-pose attributes to a set of sports plays.

Embodiments also are used to analyze an individual player's performance against a set of players across various success metrics and contexts. For example, FIG. 8 shows a histogram that has been generated to compare the body pose attributes during three-point shots taken by a single player (Stephen Curry, top) to the body pose attributes during three-point shots taken by everyone else in the league (bottom). Through this analysis and visualization, it can be inferred that this player takes a significantly higher percentage of off-balance shots (the top bar) than other players generally.

In addition to the example of basketball described throughout this disclosure, embodiments of the system are not limited to these particular sports, and the system is suitable for use in a variety of other sports, including but not limited to, for example, rugby, volleyball and American football.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. A method comprising:
receiving, by a computing system, body pose information for a plurality of plays, the body pose information obtained from video data of the plurality of plays, wherein each play of the plurality of plays comprises a plurality of players;
for each play of the plurality of plays, segmenting, by the computing system, the play into a plurality of components and annotating each component with a body pose attribute, wherein each body pose attribute is indicative of a type of movement variation occurring in each component;
for each component of the plurality of components, assigning, by the computing system, a value to the associated body pose attribute, the value describing a movement variation corresponding to the type of movement variation occurring in the component; and
generating, by the computing system, a play classifier configured to classify a target play according to its likelihood of success by training the play classifier with the annotated plurality of plays and values assigned to each component of each play.

2. The method of claim 1, further comprising:
receiving, by the computing system, a selection of a first play from a first sporting event; and
comparing, by the computing system via the play classifier, the first play to the plurality of plays to determine a likelihood of success of the first play.

3. The method of claim 2, wherein comparing, by the computing system via the play classifier, the first play to the plurality of plays to determine the likelihood of success of the first play comprises:
generating first body pose information for each player in the first play.

4. The method of claim 3, further comprising:
comparing the first body pose information for each player in the first play to second body pose information to each player in the plurality of plays.

5. The method of claim 3, further comprising:
inspecting the first body pose information to infer a value to be assigned to particular body pose attributes of the first play.

6. The method of claim 3, further comprising:
generating a histogram comparing the first body pose information for each player in the first play to second body pose information for each player in the plurality of plays.

7. The method of claim 1, wherein body pose attributes differ based on one or more of a sport, a type of play, or a segment of a play.

8. A method comprising:
receiving, by a computing system, video data for a target play, the target play comprising a plurality of players;
obtaining, by the computing system, body pose information for each player of the plurality of players in the target play;
segmenting, by the computing system, the target play into a plurality of components;
annotating, by the computing system, each component with a body pose attribute indicative of a type of movement variation occurring in each respective component;
assigning, by the computing system, a value to each body pose attribute, the value describing a movement variation corresponding to a type of movement variation occurring in each component; and
determining, by the computing system, a contribution of a target body pose attribute to a success of the target play by comparing the target body pose attribute in the target play to a similar body pose attribute in a historical play.

9. The method of claim 8, wherein the historical play is a historical failed play or a historical successful play.

10. The method of claim 8, further comprising:
generating, by the computing system, a histogram presenting the body pose attribute during the target play to second body pose attributes of other players in similar plays.

11. The method of claim 8, further comprising:
determining, by the computing system via a play classifier, a likelihood of success of the target play.

12. The method of claim 11, wherein the play classifier is trained to predict a likelihood of success of a given play.

13. The method of claim 8, wherein body pose attributes differ based on one or more of a sport, a type of play, or a segment of a play.

14. The method of claim 8, wherein segmenting, by the computing system, the target play into the plurality of components comprises:
segmenting the target play to include a first segment prior to possession, a second segment during possession, and a third segment after possession.

15. A non-transitory computer-readable medium having one or more sequence of instructions stored thereon, which, when executed by a processor, cause a computing system to perform operations comprising:
receiving, by a computing system, body pose information for a plurality of plays, the body pose information obtained from video data of the plurality of plays, wherein each play of the plurality of plays comprises a plurality of players;
for each play of the plurality of plays, segmenting, by the computing system, the play into a plurality of components and annotating each component with a body pose attribute, wherein each body pose attribute is indicative of a type of movement variation occurring in each component;
for each component of the plurality of components, assigning, by the computing system, a value to the associated body pose attribute, the value describing a movement variation corresponding to the type of movement variation occurring in the component; and
generating, by the computing system, a play classifier configured to classify a target play according to its likelihood of success by training the play classifier with the annotated plurality of plays and values assigned to each component of each play.

16. The non-transitory computer-readable medium of claim 15, further comprising:
   receiving, by the computing system, a selection of a first play from a first sporting event; and
   comparing, by the computing system via the play classifier, the first play to the plurality of plays to determine a likelihood of success of the first play.

17. The non-transitory computer-readable medium of claim 16, wherein comparing, by the computing system via the play classifier, the first play to the plurality of plays to determine the likelihood of success of the first play comprises:
   generating first body pose information for each player in the first play.

18. The non-transitory computer-readable medium of claim 17, further comprising:
   comparing the first body pose information for each player in the first play to second body pose information to each player in the plurality of plays.

19. The non-transitory computer-readable medium of claim 17, further comprising:
   inspecting the first body pose information to infer a value to be assigned to particular body pose attributes of the first play.

20. The non-transitory computer-readable medium of claim 17, further comprising:
   generating a histogram comparing the first body pose information for each player in the first play to second body pose information for each player in the plurality of plays.

* * * * *